(12) United States Patent  
Mednieks (10) Patent No.: US 7,012,997 B1  
(45) Date of Patent: Mar. 14, 2006

(54) VOICE PROMPTED USER INTERFACE FOR CENTRAL SWITCH TELEPHONE PROGRAMMING

(75) Inventor: Zigurd Mednieks, Harvard, MA (US)

(73) Assignee: Foto-Fone, Inc., Salem, NH (US)

( * ) Notice: Subject to any disclaimer, the term of this patent is extended or adjusted under 35 U.S.C. 154(b) by 124 days.

(21) Appl. No.: 09/691,518

(22) Filed: Oct. 18, 2000

(51) Int. Cl.  
　　H04M 1/64　　(2006.01)

(52) U.S. Cl. .............................. 379/88.04; 379/201.12; 379/355.03; 455/566

(58) Field of Classification Search ........... 379/201.12, 379/88.16, 201.03, 201.04, 201.05, 201.01, 379/201.02, 355.01, 355.02, 355.04  
See application file for complete search history.

(56) References Cited

U.S. PATENT DOCUMENTS

| | | | | |
|---|---|---|---|---|
| 4,788,720 A | * | 11/1988 | Brennan et al. | 379/201.04 |
| 4,899,373 A | * | 2/1990 | Lee et al. | 379/201.12 |
| 4,928,306 A | * | 5/1990 | Biswas et al. | 379/201.05 |
| 5,355,404 A | * | 10/1994 | LeDuc et al. | 379/201.05 |
| 5,509,060 A | * | 4/1996 | Hall et al. | 379/201.12 |
| 5,751,802 A | * | 5/1998 | Carr et al. | 379/201.12 |
| 5,771,279 A | * | 6/1998 | Cheston et al. | 379/201.12 |
| 6,240,172 B1 | * | 5/2001 | Zhu | 379/201.03 |
| 6,266,404 B1 | * | 7/2001 | Chon et al. | 379/201.04 |

* cited by examiner

*Primary Examiner*—Fan Tsang  
*Assistant Examiner*—Gerald Gauthier  
(74) *Attorney, Agent, or Firm*—McLane, Graf, Raulerson & Middleton, PA (57) ABSTRACT

An improved user programming method and apparatus for selecting central station features of a telecommunications device such as a telephone by means of voice prompts directly to the line user is disclosed. Prerecorded messages containing specific step by step instructions are used under the control of the central programming system. With such an arrangement, the features of each programmable button on a communications line may be remotely set up or programmed by a non technical user from his or her own phone. Additionally, a voice prompt system for programming a central programming controller may also be used to answer an incoming telephone call.

21 Claims, 4 Drawing Sheets

VOICE PROMPTED USER INTERFACE FOR CENTRAL SWITCH TELEPHONE PROGRAMMING

BACKGROUND OF THE INVENTION

The application relates generally to telephone feature programming, and more particularly to a voice prompted telephone user interface for programming a telephone central switch or a PBX.

Electronic telephone exchanges and switches, known as PBXs or key systems, are used to connect telephone extensions to a central telephone office line, either a local system owned by the individual or company, or a central office owned by the phone or telecommunications company. The individual phone extensions are known as the PBX's instruments or stations. Key system telephone instruments, such as might be found in an office or small business, may have buttons or keys that allow or enable direct selection of central office lines, thus picking up calls on hold status, connecting to other stations, etc. The keys may have colored lights or tones associated with the key that indicate the status of the communications line associated with the key.

The keys on the phone may be programmed to have the specific desired function, such as may be performed by a technician physically located at the central PBX or key system, making the desired connections. The PBX may have a memory of which functions are assigned to which key on all of the individual instruments or telephones that are controlled by the PBX or central switch. The memory may be programmed by a specific series of key strokes on a terminal device connected to a control port of the PBX or central switch. The switch may signal the telephone user with tones, flashing lights of different colors and flash patterns, etc. Such tones may be specific to an individual manufacturer, or may be generally known, such as the common busy signal.

A business or a multiple line private telecommunications system may include at least two parts. One part may be the simple telephone receiver consisting of an electronic communication line and speakers. The second part may be a feature programmer consisting of a memory and logic that may be used to program various potential features onto selected buttons and switches on the phone. Telecommunications systems may have a central PBX portion that controls the management of the plurality of physical incoming and outgoing lines that may be connected to the desired one of the telephone receivers in the overall system, or to the desired one of the multiple lines that may connect to a single one of the receivers in the overall system. The PBX acts as the central programmer that controls the special features of various buttons, switches, colored lights and indicators on the telephone receiver.

In the case of a multiple line telephone (i.e., a telephone that responds to more than one telephone number), the receiver may have indicators that show the status of what may be known as either the line appearance or the call appearance. Line appearance mode allows a user to see the status of all the outside lines. The line appearance mode provides a status report that may indicate which specific one of the multiple input lines to that specific telephone receiver may be currently active (i.e., which line you are talking on, or sending data along), which lines have a caller waiting (i.e., on hold), which lines are ringing (i.e., an incoming call that has not been answered yet), and which lines are currently not in active use. Each of the possible input lines to the specific phone may be individually activated by pressing a button programmed to enable that particular physical line. The line appearance is what might be seen on the phone of a secretary/receptionist who answers the phone of several different offices. That is, some of the lines will have a call connected to one of the multiple phone users, while another outside line may have a call to the same one of the multiple users but be on hold status, another one of the lines may have a call to a user that is currently absent and thus be leaving a voice mail message, etc.

The call appearance mode may be associated with the status of the central phone switch (or PBX) of the company phone system from the incoming trunk line to each individual phone. In call appearance mode a phone may show the status of current calls. The PBX has a database of incoming phone lines and the number and features of all of the lines going to each of the phones in the company phone system. In the call appearance mode the lights or indicators on the phone display are a logical subset of the current features of the outgoing lines of the PBX system. The subset is the set of calls and lines that the user of the phone has an interest in knowing the status.

The features of a particular phone line may include whether or not the line can be programmed to forward calls automatically to another phone by hitting a specific button and then entering the four digit extension of the phone to which all future calls will be sent until cancelled by hitting either the same specific button again, or another specified button. The features may be programmed by either sending a phone call to a specified central PBX number, or by someone physically at the PBX. Thus the specific features set up for a particular phone line are often programmed by either a technician physically at the PBX unit, or with a limited set of manipulations possible by the pressing of buttons from the user at the other end of the phone line. Buttons may be assigned special functions different from their normal operation. Many PBXs need to be connected to a separate attendant system to program the various phone lines with selected ones of the various available features. This situation makes programming a phone a time consuming and error intensive situation since two people who need to communicate back and forth may need to be involved in the programming.

A particular phone's features may not be programmed directly, but rather may be programmed through the above noted communication with the PBX/central switch. The phone may have specific features programmed by the PBX, and the features thus selected may be further customized at the phone. Phone features may be programmed by an operator at the central PBX station, and may be further viewed with the phone in the call appearance mode.

Thus there exists in the art a problem with telecommunications users either having to work their way through an often complex manual to properly program their phones, or to have to communicate with a technician physically at the central phone control site, or to limit the available programmability to those items that can be implemented at the end of a phone line by use of the ten numbered phone buttons.

SUMMARY OF THE INVENTION

In accordance with the invention, a method of program mapping selected telecommunication system features from a central programming controller to selected local instrument switches or buttons uses tones, beeps or voice prompts provided to a user at the local instrument.

In one embodiment of the invention, the central programming controller and a user interface may be remotely located from the user, and separated from the user by a telecommunication line.

In another embodiment of the invention, the central programming controller may be physically located in the same cabinet as at least one of the instruments in the telecommunications system controlled by the controller.

In another embodiment of the invention, a method of program mapping selected PBX system features to selected telephone buttons uses voice prompts at the telephone receiver and the telephone buttons. The voice prompts may be generated by at least one user interface connected to the PBX.

In still another embodiment of the invention, the PBX and the user interface may be remotely located from the telephone user, and separated from the user by a telephone line.

In yet another embodiment of the invention, the PBX may be physically located in the same cabinet as at least one of the telephones in the telecommunications system controlled by the controller.

In another embodiment of the invention, the telephone may include a computer data line, a FAX system or a scanner system, and the buttons may comprise switches including touch sensitive electronic displays.

In another embodiment of the invention, a method of using the same voice prompt system to answer telecommunication incoming signals and to program the telecommunications system is disclosed.

In another embodiment of the invention, a telephone apparatus includes a voice prompting system to allow remote programming of the phone line features. A plurality of telephone lines are connected to a plurality of telephones in a centrally controlled phone network. A plurality of phone operating features are controlled by the central controller. Each individual one of the operating features may be selectively provided to any selected one of the plurality of lines. Each individual one of the plurality of telephones has a plurality of buttons and indicator lights, and each individual one of the lines is programmed to obtain selected ones of the plurality of phone operating features by a selected series of button presses of the plurality of telephone buttons. The voice prompting system provides selected pre-recorded messages responsive to the order of the pressing of the plurality of telephone buttons.

In another embodiment of the invention, the voice prompting system may use a flashing pattern of selected ones of the plurality of indicator lights to transmit information regarding the selecting of phone button features. The features may include call forwarding, speed dial, intercom, call waiting, call hold, voice mail and conference calling.

In still yet another embodiment of the invention, the voice prompting system may use a color of selected ones of the plurality of indicator lights to transmit information regarding the selecting of phone features.

In another embodiment of the invention, the voice prompting system may use a flashing pattern and a color of selected ones of the plurality of indicator lights to transmit information regarding the selecting of phone features.

In still another embodiment of the invention, the voice prompting system may use a voice recognition system to transmit information regarding the selection of phone features to the central controller.

In the system described herein, a voice prompt system is interposed between the user and the programming of the central telephone switch (PBX) to facilitate the programming. The use of a voice interface may render assignment of specific features or functions to telephone instrument keys easier and more efficient by automating the connection of telephone extensions to a central office system using voice prompts. Voice prompts may provide a user the ability to directly program the telephone central switch with the desired features for each individual key on their own personal phone system.

DETAILED DESCRIPTION OF PREFERRED EMBODIMENTS

The problem of having often unsophisticated telecommunications users programming the features of modern phone systems may be improved by the use of a voice prompt transmitting selected prerecorded messages to the user as needed during the course of setting up a phone line. For example, the problem of programming call, line, and station appearance buttons may require many steps, and the use of the existing phone voice system to help prompt users to properly set up the individual lines may improve the probability of the phone user successfully completing the operation. This may be especially true, for example, if a local programmer is a phone user unlikely to have substantial experience in setting up telecommunications systems. This sort of problem may be helped by having the phone itself provide some help to the user, Rather than using the instruction manual, the phone itself may be used to provide a source of help to a user. How the phone may be used to provide such assistance is described elsewhere herein, and depends upon knowing a little about the operation of a phone system and various methods of setting up different modes that look at the status of the phone lines in somewhat different ways.

An example of how a telecommunications system may be initially programmed, or set up, and used in accordance with an embodiment of the telecommunications system is made with reference to FIG. 1 as described in paragraphs below.

Figure 1:
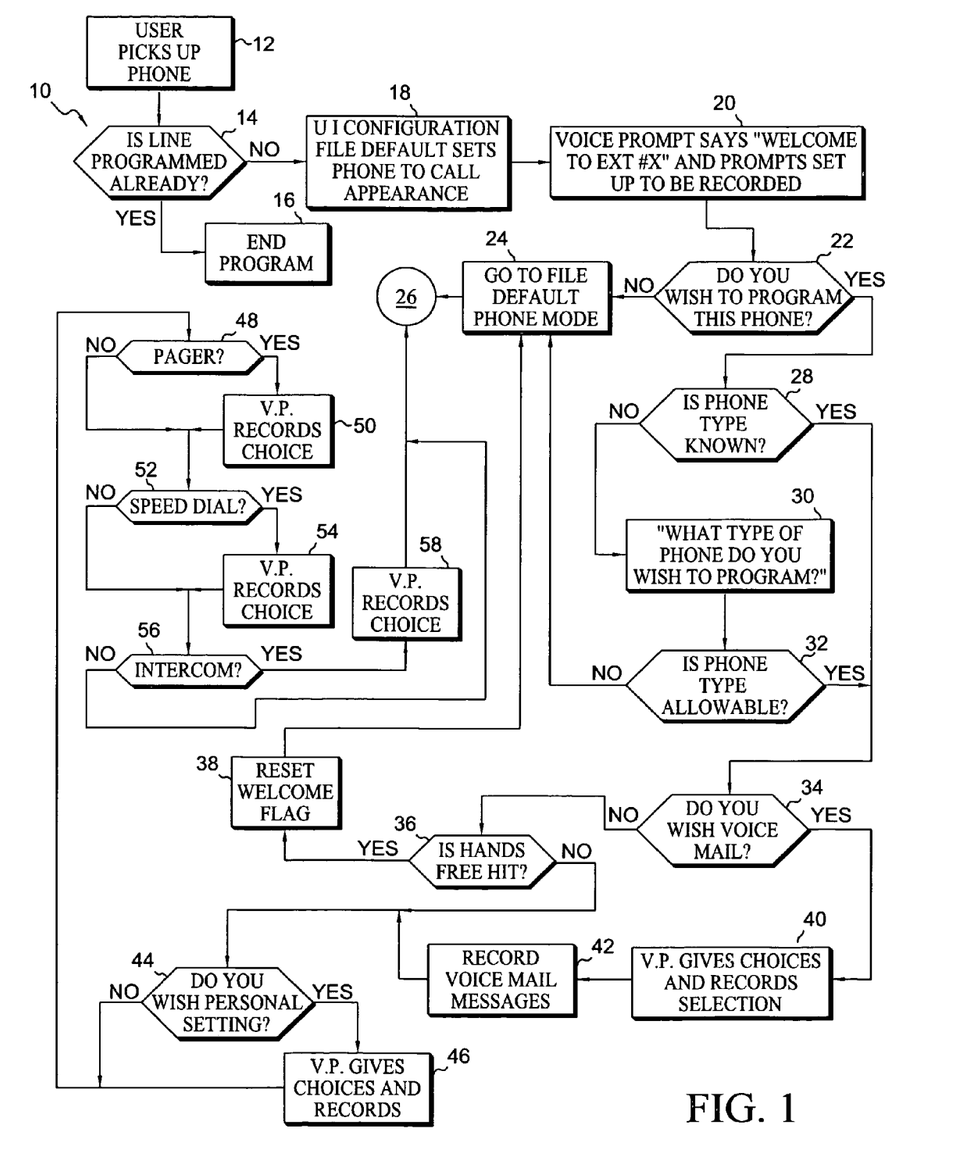
FIG. 1 is a flowchart of an initial phone set up according to the system described herein.

Referring to FIG. 1, when a user picks up a phone at a step 12, a program, such as a software program, checks a data base to see if the particular line selected has already been programmed, or if it is a new line at a step 14. It should be noted that both the database and the software program are described elsewhere herein in more detail. If the line has already been set up then the program ends at a step 16, and the line operates in the preselected manner, for example as an intercom, a regular telephone, a FAX line or a data line. If, on the other hand, it is determined at the step 14 that the line has never been previously programmed, then the user interface (i.e., UI) sets the phone to a default configuration set by a flag at a step 18, often in the call appearance mode, so that the buttons will be in position to show the current state and possibilities. A voice prompt (VP) welcomes the user to the specified line at a step 20, and provides prompts to help the user through the set up and programming procedure. The VP may be designed to encourage the user to take the time to program the new line, and may be set to continue to repeat the welcome message every time the line is used until it is properly programmed.

Following the step 20 is a step 22 where the VP asks if the user wishes to program the line. If the answer is no, control passes to a step 24 where the program sets the phone to a preselected default set up. Following the step 24 is the key programming section, represented by an off page connector 26. If the user indicates a wish to currently program the line at step 22, then the UI checks to see if the line and phone on the line are of a type that is known to the program at a step 28. If the type is known, then the program skips to a step 34. If the type is not already known, then the VP asks the user to indicate the type of phone at a step 30. The program determines if the type is allowable at a step 32, and if the answer is no, the system may be set up to the proper default value at a step 24 and the program goes to the key programming program section. If the phone is programmable then the program flow merges with the yes branch from the step 28 and goes to a step 34 where the program uses the VP to ask if voice mail should be set up. Other possible VP prompts may be included in other embodiments.

If the user indicates that no voice mail is desired on the line at the step 34, then control passes to a step 36 where, in the exemplary embodiment illustrated herein, the system checks to see if the hands free button has been pressed. Pressing the hands free button indicates that the user has decided to abandon the programming of the line at this time, so the program resets the welcome message at a step 38, sets the line to the default and proceeds to step 24 as if the user had indicated that no programming was desired at the step 22. Control then proceeds to the key programming section represented by the off page connector 26. If the response at the step 34 is yes, then control passes to a step 40 where the VP provides the prompts to indicate the various choices and records the users responses. Subsequently, control proceeds to step 42 where the various possible voice messages that may be desired for various time periods on the voice mail system may be recorded.

There are many possible programming steps that may be included in this programming selection portion of the system line set up, but for simplicity the next exemplary step in the program is shown at a step 44, where a menu of personal setting may be implemented. If no personal settings are desired, then control passes to a step 48. If personal setting are desired, then control passes from step 44 to a step 46 where the VP provides verbal prompts for the user as to what choices are permitted, which may vary depending upon the previous choices made at prior steps in the set procedure. The selections made are recorded.

At a step 48, in the exemplary embodiment of the system illustrated herein, the pager feature may be set up. If pager is desired, then at a step 50 the VP provides verbal prompts for the user as to what choices are permitted, and records the selections made. Similarly, at a step 52, the speed dial features may be selected for the phone line as a whole. However, note that the specific speed dial numbers may be programmed later in the key programming portion represented by the off page connector 26. At a step 54, the VP provides verbal prompts for the user as to what choices are permitted and records the selected features. Similarly, the intercom features are chosen at steps 56 and 58.

Finally, after the above sequence of steps has been repeated for each and every one of the possible line features, the program passes control to the key programming section represented by the off page connector 26.

Figure 2:
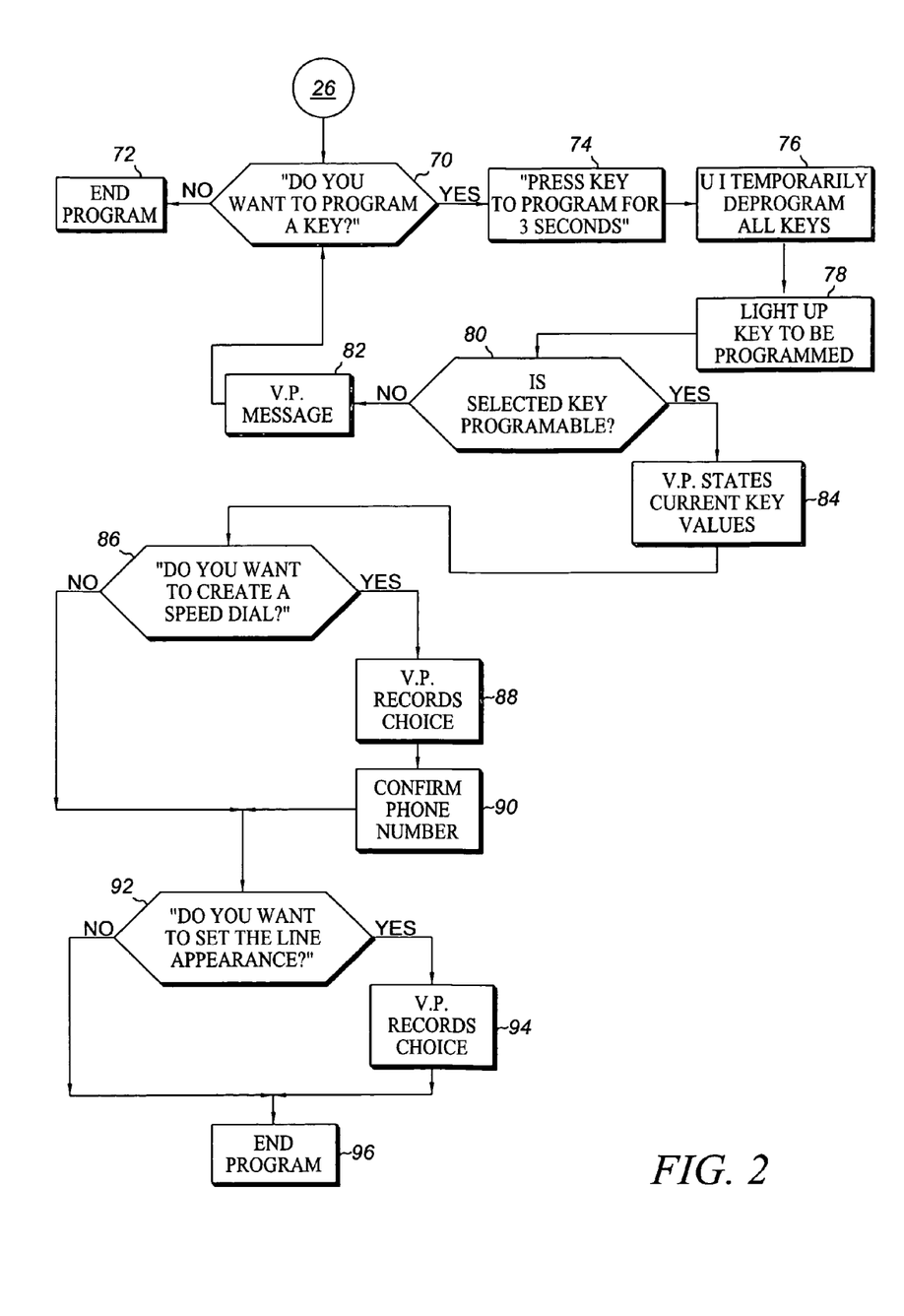
FIG. 2 is a flowchart of a portion of key programming according to the system described herein.

FIG. 2 shows the continuation of the set up and programming sequence of this illustrative embodiment, and covers the particular portion relating to the programming of individual keys of the phone. Starting at a step 70, the program checks to see if the user wants to program the individual keys. If the answer is no, then control passes to the end of the program and the phone is ready to use at a step 72. If the answer is yes, then control passes to a step 74 where the VP instructs the user to press the particular key that the user wants to specially program. The user interface temporarily deprograms all of the other keys at a step 76, and lights up the selected key at a step 78.

At a step 80, the program determines if the selected key is programmable, i.e., a user may not, for example, program one of the ten number keys. If the answer is no, then control passes to a step 82 where the VP informs the user that the key is not properly programmable and sends the user back to the step 70 to determine whether or not the user wishes to program another key. If it is determined at the step 80 is that the key chosen may be programmed, then control passes to a step 84 where the VP informs the user as to the present value (if any) of the selected key. At a step 86, the program checks if the user wishes to create a speed dial for the selected button. If the answer is no, control passes to a step 92. If the answer is yes, the VP at a step 88 provides voice prompts to the user indicating the possible choices and how to make them, and records and implements the selection made.

After the selection has been recorded at step 88, the system confirms the selection by reading the choice made back to the user at a step 90, then passes control to a step 92, where, in this example, the system asks if the user wishes to change the format from the call appearance mode to the line appearance mode, perhaps because the user might wish to see what all of the external lines are currently doing. If the answer is no, control passes to a step 96, the program ends, and the phone is ready to use. If the answer is yes, then at a step 94, the VP voice prompts the user, records and implements the selection, and confirms by reading the selection back to the user. The program then ends at a step 96, and the phone is ready to use for whatever purpose if has been set up, i.e., FAX, data, or telephone, for example.

Figure 3:
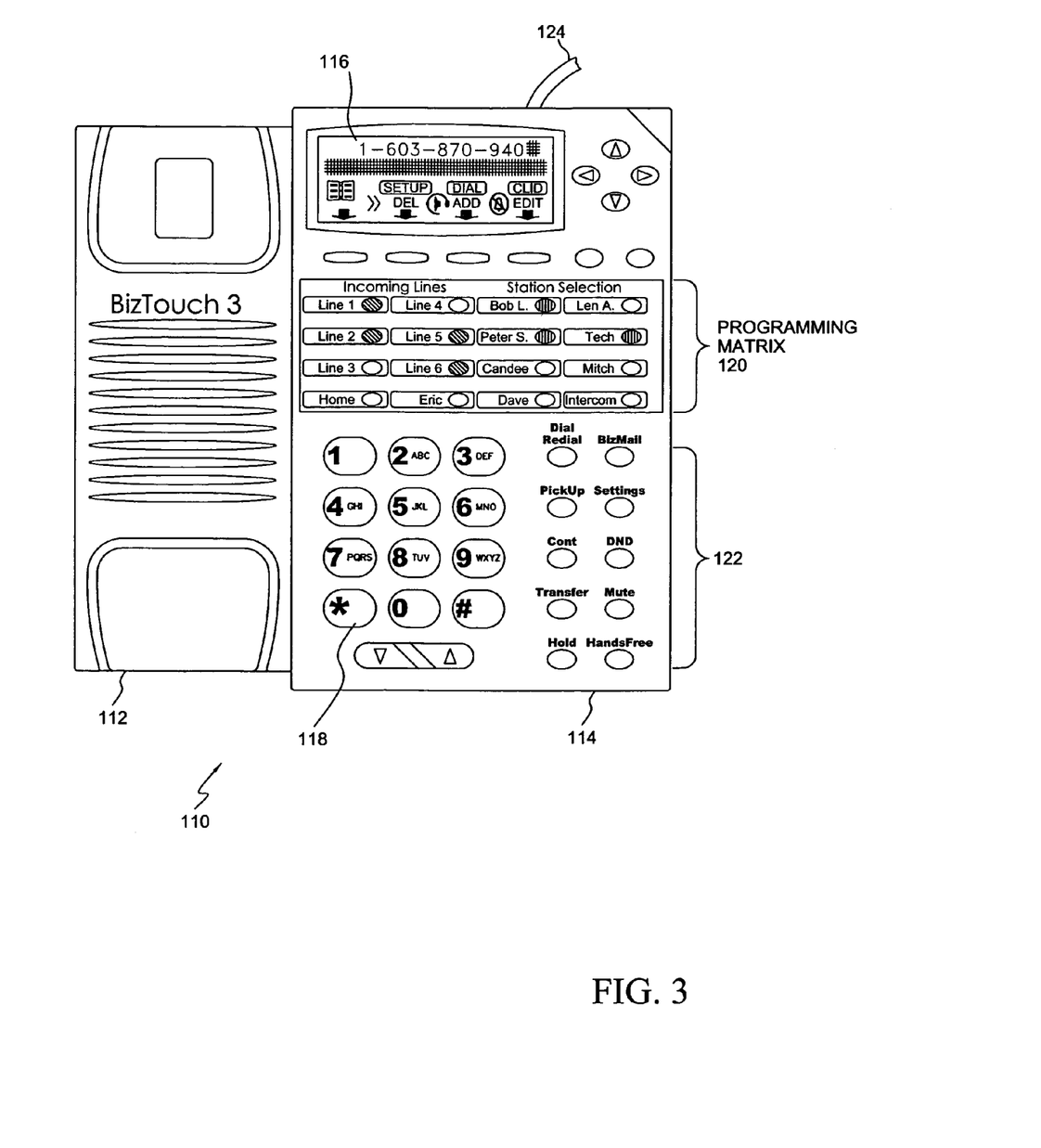
FIG. 3 shows a programmable phone used in accordance with teh system described herein.

FIG. 3 is a schematic of a phone system in accordance with an embodiment of the invention. The phone 110, may have a handset (not shown for clarity) and a cradle 112. The handset may have a microphone pickup and a speaker. The cradle may be directly attached to a selector box 114 having a plurality of buttons, colored lights and an electronic display screen 116, for choosing a desired feature or line. One embodiment may include at least a three by four (3×4) array of numbered buttons 118, for dialing telephone numbers, including at least the numbers 0 through 9, a star and a number sign button. An exemplary phone may have 16 programmable buttons arranged in a 4×4 grid, 120.

All programmable buttons may have both a green and a red LED. Multiple blink rates, steady lights and alternating red and green lights may provide different pieces of information regarding the status of each of the 16 programmable buttons.

The phone may also have buttons, 122, in a 2×5 array with the following labels: Dial/Redial, BizMail, Pickup, Settings (or Forward), Conf, DND, Transfer, Mute, Hold, Handsfree. The Forward and DND buttons may have red LEDs controllable by the user interface (i.e., UI) to indicate the present status of the chosen function. It should be noted that other embodiments may include other buttons 122 that may generally refer to "fixed function buttons" each associated with other particular functions.

The 16 programmable buttons, 120, may be programmed in one of the following ways: call appearance, line appearance, direct station set (i.e., DSS), speed dial, and intercom. There may not be a way to have both call keys and line keys appear at the same time on a phone through the normal user interface (i.e., UI). A configuration file in the set up program may default to the call appearance mode, so that for phones that aren't already set up, when the phone is plugged into the system, the buttons will be functional.

The phone includes a cable 124 for connecting the phone to an external system, such as a PBX. The cable 124 may be any appropriate type of wiring connection for providing voice and control data. For example, the cable 124 may be a single wire having different signal multiplexed thereon, multiple wires where each wire is dedicated to one or more particular functions, or some combination thereof.

The initial setup of the phone by the user will be described with reference to the interaction between the user and the system. Reference will be made to the numbers of the previously discussed figures to indicate where in the overall process the present discussion relates. Phones may be shipped from the factory with a flag in the firmware that indicate either "LINE" or "CALL". (See FIG. 1, item 18). The UI reads this flag only once, at the time the phone is first detected by the system (See FIG. 1, item 12) on an extension line of the overall system that is not currently set up, to program the buttons according to the set mode of the flag.

Initial Setup voice prompt may say "Welcome to extension 2xx. To set up this extension now, press 1." (See FIG. 1, item 20 and item 22) The program then may skip the query for the phone type, and passes through to asking if this phone extension should have voice mail service or not. (See FIG. 1, item 34). If the star button is pressed, or the handsfree key of the 2×5 matrix 22, (See FIG. 3, item 122) then the handsfree mode is entered, (See FIG. 1, item 36), thus deferring the Initial Setup. Then the buttons may be automatically programmed according to the firmware flag default setting and be usable. Picking up the handset again at a later time may cause the user to continue to get the "welcome to extension" prompt (See FIG. 1, item 20) so that the user will be reminded to set up the phone system, or personalize the phone, as desired.

To switch the phone's default appearance (i.e., line mode or call mode) once the phone has been programmed, the user may reset the extension, then plug in a phone with the proper appearance in the firmware. In one embodiment, the user may rerecord greetings and such, so users may be warned by the system not to set up their phone with the improper LINE or CALL appearance flag. (See FIG. 1, item 22).

Additional Settings, such as in the Personal Settings mode (See FIG. 1, item 44), or the Additional Menu mode, may have a flag to set or reset the phone type. For many phones, this may not be needed and instead a flag to turn the handsfree announcement feature (See FIG. 1, item 56), on or off, may be included.

A prompt (See FIG. 1, item 44) may be used. The voice prompt may say,
"Additional menu";
"To set up pager notification of voice mail, press 1"; (See FIG. 1, item 48)
"To set speed dial numbers, press 2"; (See FIG. 1, item 52)
"To choose the phone type used at this extension, press 3"; (See FIG. 1, item 30)
"To turn [ON|OFF] handsfree announcement for internal calls, press 3";
"To go back, press star."

When a user presses the '3' button, they may hear "Saved" and the setting may be toggled from ON to OFF, or vice versa depending on the current state at the time (See FIG. 1, item 50). The user may refer to written documentation to find out what they just did, if they had a question as to the current status of the phone.

To query a key, or to get into the "program a key", the user interface (i.e., the UI), a long button push (i.e., more than 3 seconds) on the key that is desired to reprogram or to program for the first time may be used. (See FIG. 2, item 26). When in this mode, the user interface (i.e., the UI) may temporarily remove the programming on all the programmable buttons on the phone (See FIG. 2, item 76), and shut off the lights on all calls in progress (See FIG. 3, item 120). Only the key that is being programmed may be lit, as a solid green light. Once the user exits out of this mode, the buttons may be automatically reprogrammed to their original settings (except for the keys reprogrammed at this cycle), and the Station Set Output Manager (the SSOM) may re-light the programmed buttons for any calls currently in progress.

Line buttons, call buttons, and intercom buttons may not be programmable through the UI. Pressing one of these, the user may hear the Prompt:
"That key is programmed as . . . "
  "line <one . . . twenty-four>"
  "call appearance <one . . . four>"
  "the intercom key".
"To query another key, press it now".
"To exit, press star".

When the user presses a key that may be programmed (See FIG. 2, item 80), they may be told how it's programmed (See FIG. 2, item 84) with the message:
"That key is programmed as . . . "
  "extension 2xx"
  <"bob laroche"> extension <2xx>"
  "speed dial <phonenumber>"
  "a custom key."
"To reprogram it, press 1"
"To query another key, press it now"
"To exit, press star".

There may be situations that depend upon prior activity with that particular key where the user may be told that there is no programming on it (See FIG. 2, item 84), such as the following example:
"That key is not currently programmed."
"To program it now, press 1"
"To query another key, press it now"
"To exit, press star".

If the user presses a key, for example, such as a fixed function button, that cannot be programmed, like BIZMAIL or TRANSFER, the user may hear the prompt set forth below (See FIG. 3, item 122):
"That key is not programmable"
"To query another key, press it now"
"To exit, press star".

To avoid having to record the error clip "that key is not programmable", the UI might alternatively say "sorry, please try again."

To program a particular key the user may enter the "Program a Key" UI by pressing 1 after the query key prompt. (See FIG. 3, item 118), using the following:
"To create a speed dial entry, press 1"; (See FIG. 2, item 86)
"For an extension, press 2";
"To go back without making a change, press star."
  in which Press 1 prompt is:
- "Dial the extension or dial 9 followed by the number you want to call."
- "When finished, press the pound key."
- "To go back, press star".

(Note: if the user enters an extension number, the system may save it as a direct station set (i.e., DSS) key and not as a general speed dial number). and the Press 2 prompt is:
- "Enter an extension"
- "To go back, press star".

To confirm the change, the UI may say "Saved", then repeat the prompt listed above. (See FIG. 2, item 88).

Pressing star may tell the system to go back to query a key. Pressing star a second time may exit the mode and reprograms the buttons.

The "INTERCOM" key in the programmable matrix (See FIG. 3, item 120), may be useful for old key system users. The UI may handle an INTERCOM keypress almost like a LINE key. Pressing the INTERCOM key while on a call with an outside party may drop the other party instead of putting it on hold. This may be how a pressing a line key also operates.

The INTERCOM key may connect to an extension that is "call wait" ringing the user's line, or an extension that has been put on hold. If there is already a call with an extension, it may be ignored in the same fashion as a LINE button. (See FIG. 3, item 120). For example, if the LINE button is pressed on the line the user is currently talking, then nothing happens. This illustrative example is based upon the situation where multiple simultaneous internal parties are disallowed.

The "INTERCOM" key may have a set of rules where the user first tries to get an extension that is call wait ringing, then tries to pick up an extension that was put on hold, or finally gives a status prompt and an internal dial tone. A specific example of pressing the INTERCOM key may be useful to further understand the order in which the preselected rules may operate. If the intercom key is pressed during a call with a CO port, then the port may be dropped, and the INTERCOM rules operate. If the intercom key is pressed during a call with an extension, then hitting the INTERCOM key may be ignored, unless multiple internal parties are allowed to be kept on hold in the system set up parameters. If the intercom key is pressed during the voicemail mode, then the system drops out of current voice mail, then the INTERCOM rules operate. If the intercom key is pressed while the handset is on the hook and idle, then the system may go into handsfree mode, then the INTERCOM rules operate. If the intercom key is pressed while the system is at the feature menu, then the INTERCOM rules operate.

Similarly to the intercom rules given above, the status of the lights on the specific buttons or keys checks the port's status and applies a "roll-up" rule, given below. (See FIG. 3, item 120).

- Ringing by another extension (i.e., the phone is on the hook): wink green two times
- CW ringing by another extension: wink green two times
- Internal call on hold: blink red two times
- Connected to internal call: steady green
- Busy: steady green
- Onhook: off Note that this means if the user is in voicemail while an internal party is on hold, the intercom light may be blinking red two times, and not steady green.

To program a key on a "Line Appearance" mode phone, (See FIG. 2, item 92), the following prompts may be used:
- "To program this key as a line, press 1";
- "For an extension, press 2";
- "To create a speed dial entry, press 3";
- "To cancel, press star."
  in which the Press 1 prompt is:
- "Enter the line number from one to <number>" (i.e., 6, 12, 18, 24 depending on the telephone cluster configuration) "then press pound"; "To go back, press star". and
  in which the Press 2 prompt is:
- "Enter the extension number";
- "To go back, press star". and the Press 3 prompt is: (See FIG. 2, item 86).
- "Dial the extension or dial 9 followed by the number you want to call."
- "When finished, press the pound key."
- "To go back, press star".

To confirm the change to the user, the UI may say "Saved", then repeat the appropriate prompt, listed above.

Pressing the star key may go back to query a key, and pressing star again may exit the mode and reprogram the buttons to the status they held prior to the current changes.

To program a key on a "Call Appearance" mode line the following prompts may be used:
- "To program this key as a call appearance, press 1";
- "For an extension, press 2";
- "To create a speed dial entry, press 3";
- "To cancel, press star."
  in which the Press 1 prompt is:
- "Enter the call appearance number from 1 to 4";
- "To go back, press star";

and the Press 2 prompt is:
- "Enter the extension number";
- "To go back, press star".

and the Press 3 prompt is:
- "Dial the extension or dial 9 followed by the number you want to call."
- "When finished, press the pound key."

A prompt may be played after "welcome to ext 201, to set up your phone now, press 1" to explain the various modes of operation.

(See FIG. 1, item 20). The prompt may be as follows:
- "In call appearance mode your phone will show you status about your calls."
- "To use call appearance mode, press 1".
- "Line appearance mode allows you to see the status of all your outside lines."
- "To use line appearance mode, press 2"
- "To exit, press star."

The user may also be able to switch the line or call appearance modes inside Personal Settings (See FIG. 1, item 44), the Additional Settings menu (9) using a prompt:
- "Additional settings";
- "To setup pager notification of voice mail, press one";
- "To set speed dial numbers, press two";

"To choose the mode for programmable keys, press three";

"To go back, press star."

in which Prompt is:

"Additional settings"

"To setup pager notification of voice mail, press one"

"To set speed dial numbers, press two"

"To choose the mode for programmable keys, press three."

"To choose the default language for this extension, press four"

"To go back, press star."

and the Press 3 prompt is:

"This phone is in . . . "

"[default|custom] line appearance mode"

"[default|custom] call appearance mode"

"To change the mode, press 1"

Then the user may hear the appropriate prompt, as above.

The above described exemplary initial setup procedure of a telephone by the user is described to show an example of user interaction the programming system may provide with the PBX or other central switch. Other examples may be illustrated by one of ordinary skill in the art. An exemplary description of an implementation of the PBX or central switch connection to the individual telephone instrument or station will now be given with reference to FIG. 4.

Figure 4:
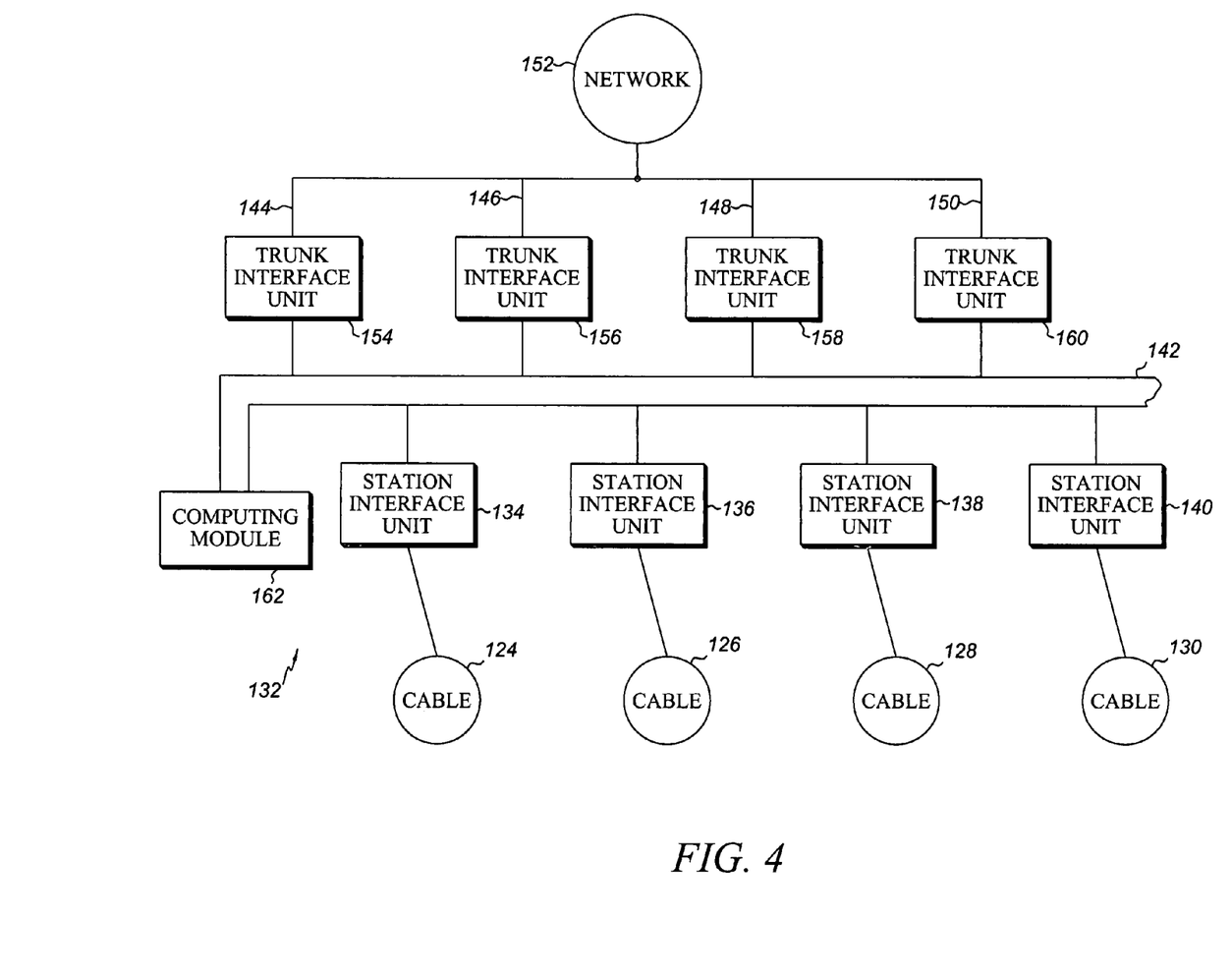
FIG. 4 illustrates a PBX system in communications with the telecom network according to the system described herein.

FIG. 4 is an overall diagram of a PBX system in communications with the wide area telecom network. FIG. 4 shows the connection of the individual telephone 110 of FIG. 3 through the cable 124 connecting the phone to the PBX, as well as three additional exemplary phone lines 126, 128 and 130, which all connect phone systems to the PBX 132. The cables 124 through 130 connect via either fixed or removable connections (i.e., typical telephone jacks) to a plurality of station interface units, 134, 136, 138 and 140, respectively. The station interface units 134, 136, 138 and 140 may provide signal amplification (depending on how far the phone is from the PBX), signal integrity and error correction capability (depending upon the local line noise problem and requirements, such as for a high speed computer signal line), and signal timing matching for avoiding collisions with other signals on the bus line 142. The bus line may be a multiplexed line, a superheterodyne signal cable, a fiber optic cable or a simple electrical cable as the specific requirements of the overall telecommunications system vary.

The bus 142 provides each of the station interfaces, and therefore the individual phone systems connected to the station interfaces, with the ability to connect to any of a plurality of external phone or telecommunication trunk lines 144, 146, 148 and 150, which may be separate trunk lines, or combined at some point into a single major telecommunications trunk line that is part of a wide area telecommunications network 152. The trunk lines 144, 146, 148 and 150 are connected to the bus 142 through trunk interface units 154, 156, 158 and 160, respectively, in this illustrative embodiment.

The ability of the described systems to make and control appropriate connections between the telephones and other telecommunications devices such as computers and FAX machines, on the cables 124–130 and the incoming and outgoing trunk lines 144–150, is provided by an electronic computing module 162. The computing module 162 is preferably signal processor and voice processing capable, and has sufficient memory to contain the specific features programmed into each key of each phone of the system. For example, the computing module 162 memory might contain that the phone 110 (see FIG. 3) on line 124, has speed dial connected to the left hand button of the electronic display 116 of FIG. 3, and that in addition, when the speed dial button is pressed and the numbers 98 of the numeric array 118 is then pressed, that the user wishes to connect to a stored telephone number value. The computing module 162 would also store the information regarding internal office station connection values, such as Dave's number from the programmable matrix 120 of FIG. 3, and etc. Note that there may be more than a single computer microprocessor in the computing module 162, and there may be a plurality of modules 162 distributed around the overall PBX system 132.

The software included in an embodiment of the computing module 162 may be in any of many languages known in the art in accordance with details of each particular embodiment. A preferred language may depend, for example, upon the familiarity of the available programmers, languages are already in use within the specific company, and other individual factors. The software may include a variety of different features, such as detecting changes in the electrical voltage of the lights, audio signalers such as bells, beepers and buzzers, and a plurality of different tones. The software may also provide for blinking lights at different rates or a steady light, and, in either instance, may also provide for signaling using different colored lights. Further, the software may also provide one of a plurality of either pre-recorded voice prompts, or generate recognizable voice messages, to be used in helping a user to provide the proper sequence of key strokes needed to program a feature button or key on a telephone, computer line or FAX line.

Additionally, an embodiment of the computing module 162 may also include database software and/or hardware used in connection with performing, for example, processing associated with step 14 of flowchart 10 of FIG. 1. As known to those of ordinary skill in the art, any one of a variety of commercially available database software packages may be used in an embodiment in accordance with the details of each particular implementation.

In an illustrative example of the operation of such a system 132, a user on a phone connected to the cable 124, may pick up the phone (See step 12 in FIG. 1). The module 162 checks memory and notes that the phone on line 124 has never been programmed before, i.e., it may be a new installation. The module 162 then goes to the portion of memory associated with the procedures outlines above with reference to FIG. 1, and either provides the user with voice prompts to program the individual buttons and keys, or goes to a default set up mode stored in memory (See step 22 in FIG. 1). Thus the module 162 enables the user to more easily program the desired features of the phone through the use of voice prompts.

In another illustrative example of the operation of such a system, a user on a phone connected to the cable 124, picks up the phone (See step 12 in FIG. 1). The module 162 checks memory and notes that the phone on line 124 has been previously programmed before, and that the last button in the third row of the programmable matrix 120 has been programmed to connect the next unused line (for example line 3) to the phone number XYZ-QRST, which is coworker Dave's phone number (See FIG. 3). The module 162 connects the line 124 to either the appropriate line 126, 128 or 130, and rings Dave's line with the internal call signal, or routes line 124 to an open one of the trunk line interfaces 154–160 with the stored phone number for Dave, to the area telephone network 152 switch board (not shown). Such a feature is called speed dial.

Other examples of telephone key features such as call forwarding, intercom, local conference calls, remote conference calls, and the like may also be included, as operating via the computer module 162, and being initially programmed, and reprogrammed as desired at any time, by the use of the voice prompted key strokes employed by the phone user to communicate with the central switch or PBX without the intervention of a dedicated phone technician.

The above described arrangement improves the ease and accuracy of programming the assignment of functions on a telephone instrument connected to an electronic PBX by voice prompting a phone user step by step on the sequence of key strokes required, and providing simple feedback information to the user on the results of the programming. Several different prompts may also be employed in guiding a user through the operation of making a key assignment, including the current value of the key, the allowable functions for the specified key, and the results of the key strokes.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of program mapping telecommunication system features in a telecommunication system, comprising:

providing a local instrument in communication with a central programming controller and comprising a plurality of switches;

said central programming controller having a plurality of telecommunication system features, the central programming controller connecting the local instrument to an outside telephone network;

prompting a user at said local instrument using a first audible prompt selected from one or more tones, beeps, buzzes, and voice prompts provided by the central controller to designate whether one of said plurality of switches is to be programmed;

receiving a first user input in response to the first audible prompt, said first user input designating whether one of said plurality of switches is to be programmed;

if one of said plurality of switches is to be programmed, temporarily deprogramming said plurality of switches and prompting a user at said local instrument using a second audible prompt selected from one or more tones, beeps, buzzes, and voice prompts provided by the central controller to select a one of said plurality of switches to be programmed;

receiving a second user input in response to said second audible prompt, said second user input designating a selected one of said plurality of switches to be programmed;

determining whether the selected one of said plurality of switches to be programmed is programmable;

if the selected one of said plurality of switches to be programmed is not programmable, indicating to the user that selected one of said plurality of switches to be programmed is not programmable;

if the selected one of said plurality of switches to be programmed is programmable, prompting a user at said local instrument using a third audible prompt selected from one or more tones, beeps, buzzes, and voice prompts provided by the central controller to select a one of said plurality of telecommunication features;

receiving a third user input in response to said third audible prompt, said third user input designating a selected one of said telecommunication features; and storing data in a memory of the central programming controller in response to said third user input, said data mapping the selected one of the plurality of telecommunication system features on the central programming controller to the selected one of said plurality of switches on said local instrument.

2. The method of claim 1, further comprising:

remotely locating the central programming controller and a user interface from the user, and separating the central programming controller and the user interface from the user by a telecommunication connection.

3. The method of claim 1, further comprising:

physically locating the central programming controller in the same cabinet as the at least one local instrument in a telecommunications system controlled by the central programming controller.

4. The method of claim 1, wherein the at least one local instrument is one of a telephone, a FAX, a computer, and a scanner.

5. The method of claim 1, wherein the local switches include buttons on a telephone.

6. The method of claim 1, wherein the switches are local switches including at least one contact sensitive region of an electronic display.

7. The method of claim 1, wherein the switches further comprise at least one of steady lights, multicolored light, and lights blinking at selected rates.

8. The method of claim 1, wherein the plurality of telecommunication system features further comprise at least one of call forwarding, speed dial, intercom, call waiting, call holding, voice mail and conference calling.

9. The method of claim 1, wherein the central programming controller is selected from a PBX and a key system.

10. The method of claim 1, wherein the voice prompts are included in a voice prompt system of the telecommunication system, and the method further including:

using said voice prompt system to answer a telephone call.

11. The method of claim 9, wherein the central programming controller is a PBX.

12. The method of claim 1, wherein the central programming controller comprises a voice processing system for said prompting step and for handling incoming calls.

13. A method of program mapping selected ones of a plurality of PBX system features to selected ones of a plurality of telephone buttons on a telephone receiver, the method comprising:

prompting a user at the telephone receiver and the telephone buttons using a first voice prompt;

receiving a first user input in response to said first voice prompts, said first user input designating whether one of said plurality of telephone buttons is to be programmed;

if one of said plurality of telephone buttons is to be programmed, temporarily deprogramming said plurality of telephone buttons and prompting a user at said local instrument using a second voice prompt to select a one of said plurality of switches to be programmed;

receiving a second user input in response to said second voice prompt, said second user input designating a selected one of said plurality of telephone buttons to be programmed;

determining whether the selected one of said plurality of telephone buttons to be programmed is programmable;

if the selected one of said plurality of telephone buttons to be programmed is not programmable, indicating to the user that selected one of said plurality of telephone buttons to be programmed is not programmable;

if the selected one of said plurality of telephone buttons to be programmed is programmable, prompting a user at said local instrument using a third voice prompt to select a one of said plurality of telecommunication features;

receiving a third user input in response to said third audible prompt, said third user input designating a selected one of said telecommunication features;

said first, second, and third voice prompts being generated by at least one user interface connected to the PBX, the PBX system connecting the telephone receiver to an outside telephone network; and storing data in a memory of the PBX system in response to said third user input, said data mapping the selected one of said PBX system features to the selected one of said plurality of telephone buttons on said local instrument.

14. The method of claim 13 further comprising:
remotely locating the PBX and the user interface from a user; and
separating the PBX and the user interface from the user by a telephone line.

15. The method of claim 13 further comprising:
physically locating the PBX in the same cabinet as at least one telephone in a telecommunications system controlled by the controller.

16. The method of claim 13, wherein the telephone receiver further includes one of a FAX, a computer data communications line, and a scanner.

17. The method of claim 16, wherein the telephone buttons further comprise switches on a telephone.

18. The method of claim 17, wherein at least one of the switches further includes at least one contact sensitive region of an electronic display.

19. The method of claim 17, wherein at least one of the switches further includes at least one of steady lights, multicolored light, and lights blinking at selected rates.

20. The method of claim 13, wherein the PBX system features include at least one of call forwarding, speed dial, intercom, call waiting, call hold, voice mail and conference calling.

21. An apparatus for configuring a telecommunications system, comprising:
a local instrument comprising a plurality of switches;
a central programming controller connecting a local instrument to an outside telephone network; and
one or more programs, performed by the central programming controller, said one or more programs:
prompting a user at said local instrument using a first audible prompt selected from tones, beeps, buzzes and voice prompts to designate whether one of said plurality of switches is to be programmed;
receiving a first user input in response to said first audible prompt, said first user input designating whether one of said plurality of switches is to be programmed;
if one of said plurality of switches is to be programmed, temporarily deprogramming said plurality of switches and prompting a user at said local instrument using a second audible prompt selected from one or more tones, beeps, buzzes, and voice prompts provided by the central controller to select a one of said plurality of switches to be programmed;
receiving a second user input in response to said second audible prompt, said second user input designating a selected one of said plurality of switches to be programmed;
determining whether the selected one of said plurality of switches to be programmed is programmable;
if the selected one of said plurality of switches to be programmed is not programmable, indicating to the user that selected one of said plurality of switches to be programmed is not programmable;
if the selected one of said plurality of switches to be programmed is programmable, prompting a user at said local instrument using a third audible prompt selected from one or more tones, beeps, buzzes, and voice prompts provided by the central controller to select a one of said plurality of telecommunication features;
receiving a third user input in response to said third audible prompt, said third user input designating a selected one of said telecommunication features; and
generating a map mapping the selected one of said plurality of telecommunication system features in the central programming controller to the selected one of the plurality of switches on said local instrument in response to said third user input; and
storing the map in a memory of the central programming controller.

* * * * *